July 30, 1963    R. E. VON BERG ETAL    3,099,329
RECIPROCATING HYDRAULIC SPEED CONTROL DEVICE
Filed Jan. 19, 1961
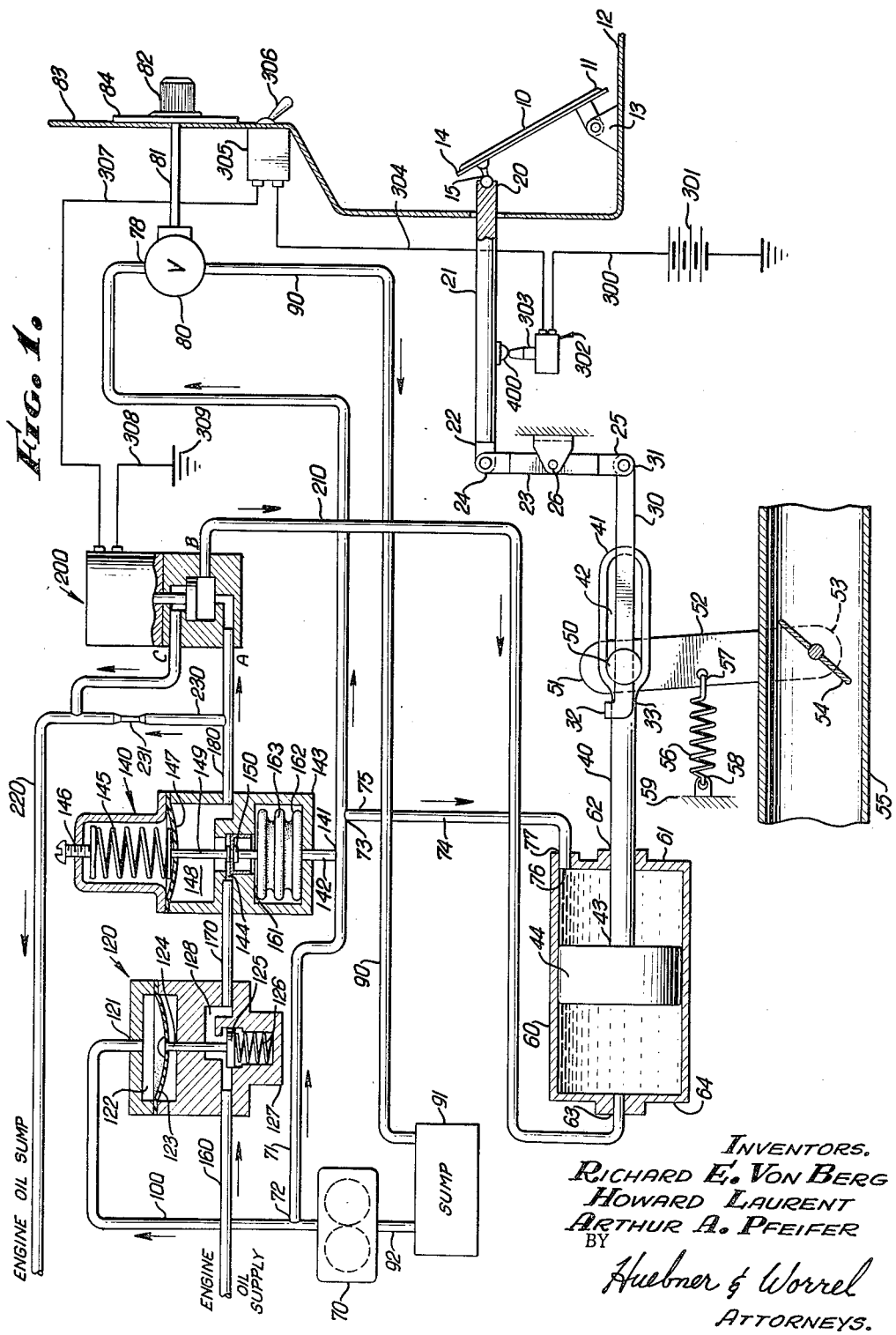
INVENTORS.
RICHARD E. VON BERG
HOWARD LAURENT
ARTHUR A. PFEIFER
BY
Huebner & Worrel
ATTORNEYS.

United States Patent Office 3,099,329
Patented July 30, 1963

3,099,329
RECIPROCATING HYDRAULIC SPEED
CONTROL DEVICE
Richard E. Von Berg, Anaheim, Howard Laurent, Corona del Mar, and Arthur A. Pfeifer, Whittier, Calif., assignors to Rheem Manufacturing Company, New York, N.Y., a corporation of California
Filed Jan. 19, 1961, Ser. No. 83,827
18 Claims. (Cl. 180—82.1)

This invention relates to a device for rapid adjustable control of the speed of operation of internal combustion engines, and the device is particularly adaptable for use on automotive vehicles where it is desired to regulate the speed of operation of the internal combustion engine of the vehicle relative to the vehicular speed.

Modern automotive vehicles are provided with high speed engines with substantial horsepower, and can be rapidly and smoothly accelerated to undesired excessive vehicular speeds unless the operators of the vehicles are constantly alert. This is particularly true when such vehicles are being operated on modern open highways, when the drivers are required to pay constant attention to the cars' speedometers in order to avoid excess speeds, especially as indicated by changing speed zone requirements.

Many devices to control maximum speed of operation of engines even when excess acceleration is applied (as for example, so-called "governors") have been frequently used, but such devices do not permit "override," which is important in vehicular operation.

Other rather complex devices operated by vacuum, manifold pressure, or an elaborate electrical system, have been offered, but none of them are as flexible as the device of the present invention which, by its fast reciprocating hydraulic movements, offers smooth, rapid adjustment to changing highway vehicle operating conditions so as to permit more exact maintenance of desired, predetermined speeds, while at the same time providing quick "override" and "underride" features not present in other devices.

The device of the present invention can be quickly and easily activated merely by closing a readily accessible master electrical switch and the simple setting of a speed indicator dial, and can be de-activated just as quickly and easily by opening said master switch, or by "overriding" by increasing pressure on the vehicle's accelerator pedal, and by "underriding" by decreasing pressure on said accelerator pedal.

The many advantages and the great flexibility of the device of the present invention can best be illustrated by considering various driving conditions encountered in the actual operation of a modern-day automobile.

In normal city driving, where higher vehicular speeds are not desirable (and in fact often impossible of attainment), and where constant braking, stopping, short acceleration, and slower operation are in order, the use of a speed control device is unwarranted and often undesirable. Under such conditions, the device of the present invention is quickly and easily rendered inoperable by the mere opening of a master control switch, readily accessible on, say, the car's dashboard. Under that condition, the operation of the vehicle is standard, speed being controlled by the normal operation of the accelerator pedal and the brakes.

When the vehicle is operated on an open highway, however, engine speed control related to vehicular speed becomes highly desirable, in order to permit the vehicle's driver to maintain, but not unwittingly to exceed predetermined speeds without the necessity of constant reference to the car's speedometer, and to accomplish this purpose the device of the present invention may be quickly and easily rendered operable by a simple setting of an accessible dial, again, say, on the car's dashboard, and the closing of the equally accessible master switch.

Under emergency operating conditions, when the device of the present invention is operating to control the vehicle's speed, and it is desired either to increase vehicle speed suddenly (as, for instance, in passing a slower moving vehicle), or to decrease speed suddenly (as, for instance, to avoid crashing into a stalled vehicle), increased pressure on the accelerator pedal will "override" the device of the present invention, or decreased pressure will "underride" it, so that, as an added safety feature, the device may be rendered temporarily inoperative without the necessity of taking the additional step of opening the master control switch.

When a vehicle is being operated on a highway running over rolling terrain, the vehicle speed will increase, due to momentum, when the car starts on a down-grade, and will similarly decrease when the car starts on an up-grade. Speed control devices presently in use do not have a quick recovery feature operable under such conditions, and a fluctuation of several m.p.h. from the desired speed occurs in such devices. It has been found that the reciprocating hydraulic action of the device of the present invention rapidly and smoothly limits this speed fluctuation to a minimum, and in tests on vehicles with a substantial over-all weight, and hence with a greater momentum potential, this speed fluctuation has been controlled within a reasonable range under sharp grade operating conditions, and even a lesser range under decreased grade operating conditions.

It will thus be seen that an object of the present invention is to provide a speed control device for an internal combustion engine, and particularly for the internal combustion engine of an automotive vehicle which is controlled by vehicular speed and which provides a high degree of rapid flexibility in operation.

It is another object of the invention to provide such a device which may be readily mounted on a standard internal combustion engine.

It is still another object of the invention to provide such a device which may be installed and utilized without changing the normal operating procedures applicable to an automotive vehicle.

It is a further object of the invention to provide such a device which may be readily rendered operable, and may also be readily rendered inoperable to allow for normal operation of a vehicle.

It is a still further object of the invention to provide such a device which may be quickly and easily "overridden" and "underridden," but which is still otherwise operative, and which maintains the vehicle in constant, complete control of the operator.

It is a further object of the invention to provide such a device which is efficient but compact, and which requires a minimum expenditure of time and money to install, without requiring major alterations in the internal combustion engine with which it is to be used, or in the vehicle itself.

Still a further object of the invention is to provide such a device which permits rapid, automatic adjustment to meet varying vehicle speed conditions, thus permitting substantial maintenance of predetermined vehicular speed without appreciable variation therein.

Finally, it is a further object of the invention to provide such a device which is inexpensive to manufacture, assemble and operate.

With these and other objects in view, the invention consists of the construction, arrangement and combination of the various parts of the device whereby the objects contemplated are attained, as hereinafter set forth, pointed out in the appended claims, and illustrated in the accompanying drawings.

In the drawings:

FIGURE 1 is a diagrammatic representation of the device of the present invention.

As shown in the drawings, a throttle accelerator pedal 10 is movably mounted adjacent one end 11 of said pedal 10 on the floor board 12 of an automotive vehicle by any suitable means, such as a hinge mounting 13. Adjacent the other free end 14 of said pedal 10 is a suitable pivotal mounting 15, such as the universal ball joint and lever mounting illustrated.

Operatively connected to said mounting 15 at one end 20 is a rod 21. Pivotally connected at or adjacent to the other end 22 of rod 21 is a rocker arm 23, rocker arm 23 being connected to rod 21 at or adjacent to one end 24 of said rocker arm 23. Rocker arm 23 has another end 25, and is pivotally connected intermediate its ends 24 and 25, as by pivotal connection 26, to a stationary object, such as the engine block (not shown) or other stationary object.

A rod 30 is pivotally connected at or adjacent to its end 31 to end 25 of rocker arm 23. A flange or shoulder 32 is formed at the other end 33 of rod 30.

A piston actuator rod 40 is disposed in extended parallel relationship with rod 30, and said actuator rod 40 has an end 41, adjacent to which is an elongate slotted opening 42. The other end 43 of said actuator rod 40 is connected to a piston 44.

Slidably disposed in said elongate slotted opening 42 is a shank 50, said shank 50 being mounted at one end thereof at or adjacent to end 51 of a link 52. The other end 53 of said link 52 is operatively connected to a flow valve or butterfly valve 54 of a carburetor 55.

A tension spring 56 may be mounted at one end 57 thereof on link 52 intermediate the ends 51 and 53 of said link 52, said tension spring 56 being anchored at its other end 58 to any stationary object 59, such as the engine block, said spring 56 being disposed so as to bias link 52 and butterfly valve 54 in a normally closed position in carburetor 55.

Piston 44 is slidably disposed in a hydraulic cylinder 60, and said actuator rod 40 protrudes from one end 61 of said cylinder 60 through a suitably packed opening 62 in said end 61 of cylinder 60.

A standard, fixed-volume, hydraulic pump 70 is driven by the vehicle's speedometer cable (not shown) or by other suitable drive means directly related to the vehicular speed of the automotive vehicle. If the device should be used with a stationary engine, instead of with the engine of a vehicle, pump 70 is operated by a drive means directly related to the load change factor of the engine.

A first hydraulic fluid outlet line 71 is operatively connected to said pump 70 at one end 72 of said line 71 which, for the purpose of convenience, may be connected by a T-joint to another hydraulic fluid outlet line hereinafter described, instead of being directly connected to said pump 70.

Intermediate the ends of said outlet line 71 is a T-joint 73, to which is operatively connected a second hydraulic fluid line 74 by one end 75 of said line 74. The other end 76 of said line 74 provides hydraulic fluid access to cylinder 60 by way of a port 77 in end 61 of cylinder 60.

The other end 78 of said first line 71 is operatively connected to a pressure regulating valve 80. Pressure regulating valve 80 may be selectively regulated by any suitable means, such as an operating rod 81 connected to a dial knob 82 mounted in readily accessible position on the automobile's dashboard 83, in association with a dial 84 containing various vehicular speed indications.

A third hydraulic fluid line 90 leads from pressure regulator valve 80 to a sump or reservoir 91, and a fourth hydraulic fluid return line 92 leads from sump 91 to pump 70.

A fifth hydraulic fluid outlet line 100 leads from pump 70 (through a T-joint connection with end 72 of line 71, if desired) to a diaphragm pressure valve 120 at one end 121 of said valve 120.

Pressure valve 120 has a chamber 122 adjacent end 121, and line 100 has fluid access to said chamber 122. Mounted transversely in said chamber 122 is a diaphragm 123. A valve stem 124 is mounted on diaphragm 123 at one end of said valve stem 124, and at the other end of said valve stem 124 is a valve seat 125. A spring 126 is seated internally in valve 120 adjacent the other end 127 of valve 120 and abuts on valve seat 125. A transverse fluid passageway 128 is formed in valve 120, and spring 126 is disposed so as to normally bias valve seat 125 to close passageway 128.

Line 71 leads to a servo pressure regulator valve 140, which is normally open, operative connection being made by any suitable means, such as a T-joint 141 mounted on line 71 intermediate the ends 72 and 78 of said line 71 and a sixth hydraulic fluid connector line 142, said connector line 142 being mounted at one end 143 of servo pressure regulator valve 140.

A first fluid pressure outlet line 160 leads from the oil supply system of the engine (not shown) to one end of passageway 128 in diaphragm pressure valve 120. A second fluid pressure line 170 leads from the opposite end of said passageway 128 to a transverse fluid passageway 144 in servo pressure regulator valve 140. A third fluid pressure line 180 leads from the opposite end of said passageway 144 to a first port A in a by-pass solenoid valve 200.

At the end of servo pressure regulator valve 140 opposite end 143, mounted internally in valve 140, is a spring 145. Spring 145 may be seated on a screw adjustment 146 which regulates compression in said spring 145. Spring 145 is seated at its other end on a diaphragm 147, which is mounted transversely in a chamber 148. A valve stem 149 is mounted on diaphragm 147 at one end of said valve stem 149, and at the other end of valve stem 149 is a valve seat 150, disposed to open and close passageway 144.

Valve seat 150 is mounted on a bellows 163 at a movable end 161 of said bellows, said bellows being disposed in a chamber 162 adjacent the end 143 of valve 140. Said bellows 163 is seated at its other end on end 143 of valve 140, and is disposed so as to be activated by fluid pressure in line 142.

A fourth fluid pressure line 210 leads from a second port B in said by-pass solenoid valve 200 to cylinder 60, which it enters at port 63 in end 64 of said cylinder 60, opposite end 61.

A fifth fluid pressure line 220 leads from a third port C in by-pass solenoid valve 200 to an engine oil sump or reservoir (not shown).

A sixth fluid pressure line 230 gives fluid access from the third fluid pressure line 180 to fifth fluid pressure line 220 intermediate the ends of said lines 180 and 220, and line 230 has a fixed orifice 231 mounted intermediate its ends.

The electrical system of the device has a line 300 leading from an electrical power source, such as a battery 301, to one side of a micro switch 302. Normally, line 300 would pass through the standard ignition switch (not shown). Micro switch 302 is controlled by a plunger 303, and is normally open.

A line 304 leads from the other side of micro switch 302 to one side of a master switch 305, which may be accessibly mounted on dashboard 83, and has a throw-arm 306.

A line 307 leads from the other side of master switch 305 to by-pass solenoid valve 200, and another line 308 leads from solenoid valve 200 to a suitable ground 309.

A detent 400 is mounted on rod 21 and disposed so as to make abutting contact with plunger 303 of micro switch 302 and thus close micro switch 302 when predetermined pressure is applied to pedal 10.

Consideration of various vehicle driving conditions will best illustrate the operation of the device of the present invention.

When the vehicle is parked and the engine is not operating, pump 70 is, of course not operating to pump fluid under pressure into any of the lines. Similarly, no oil pressure is built up in the engine oil supply system, and the device is entirely in static condition.

If the engine is now started, with master switch 305 open, pump 70 will not be operative, because the vehicle is not moving forward, but oil pressure will, of course, build up in line 160. However, because pump 70 is not operating to build up fluid pressure in line 100, passageway 128 in diaphragm pressure valve 120 will be closed, and no oil pressure will build up in line 170 or elsewhere in the engine oil supply fluid pressure system.

Valve 120, normally closed, acts as a safety control. A predetermined pressure in line 100, acting on diaphragm 123 in valve 120 is required to open valve 120 and allow said pressure to pass into line 170 to servo pressure regulating valve 140.

In the event the engine is running but the vehicle is not moving, with the vehicle on speed control, with master switch 305 and micro switch 302 closed, and consequently with solenoid valve 200 open (as would be the case if the operator has stopped for a red traffic light, for instance), uncontrolled pressure could enter cylinder 60 on the left side of cylinder 60, forcing piston 44 sharply to the right and opening butterfly valve 54, causing a sudden, undesired burst of speed, because there would be no counterbalancing pressure on the right side of cylinder 60 (pump 70 being inoperative to produce such counterbalancing pressure). Such an undesired result is avoided by the operation of normally closed valve 120.

If the automobile's clutch is then engaged and the vehicle moves forward, but with master switch 305 open, pump 70 will be activated, but because solenoid valve 200, normally closed, is not activated, fluid pressure generated by pump 70 in line 71 will cause hydraulic fluid to flow through line 71, passing pressure regulating valve 80, normally open sufficiently to accomplish this purpose, and said fluid will return by way of line 90, sump 91, and line 92 to pump 70, to be recirculated in the same manner.

Under these conditions, pump 70 will also cause a flow of fluid in line 100, and passageway 128 in diaphragm pressure valve 120 will thus open to allow a flow of oil under pressure to and through normally open servo pressure regulating valve 140. However, because solenoid valve 200 is not activated, and port A of said valve 200 is closed, the oil under pressure will pass through by-pass line 230 and fixed orifice 231, and then through line 220 and back to the engine oil sump, where it is available for similar recirculation.

Also, under these conditions, with solenoid valve 200 de-energized, port A will be closed, but ports B and C will be open. Pressure in line 210, and in the left side of cylinder 60, as illustrated in the drawing, will thus be relieved, but at the same time, pressure generated by pump 70 will build up in line 74 and in the right side of cylinder 60. Piston 44 will thus be caused to move to the left, and actuator rod 40 will also move to the left, to inoperative position, permitting the mechanical operation of carburetor 55, while at the same time the speed control features of the device are inoperative. With accelerator pedal 10 depressed, rod 21 will move forward, to the left in the diagrammatic representation in the drawing, causing rod 30, activated by rocker arm 23, to move to the right. Shoulder 32 will thus engage shank 50 and cause it to move to the right, while actuator rod 40 remains stationary, slotted opening 42 being sufficiently elongate to permit the uninterrupted slidable movement of shank 50 therein. The movement of shank 50 to the right will pivot link 52 against the biasing action of spring 56, and will cause butterfly valve 54 to open in carburetor 55, thus accelerating the speed of the engine.

It has been found that the most satisfactory operation of the device is attained when pump 70 is regulated to build up pressure when vehicle speed reaches 15 m.p.h. or above, but this is not intended as a limitation on the operative features of the device.

If the vehicle is proceeding along an open highway under the mechanical operation hereinabove described, at say, 20–25 m.p.h., with the speed control function of the device effectively inoperative, and the driver now wishes to utilize the speed control features of the device, he selects his desired speed on dial 84 and turns knob 82 to that selected speed. For instance, if he selects 40 m.p.h. as his desired controlled speed, he turns the dial knob 82 to that indicated speed. He then throws arm 306 to close master switch 305 and eases up his foot pressure on pedal 10 until he feels detent 400 abutting on and depressing plunger 303, thus closing micro switch 302 and completing the electric circuit to and through solenoid valve 200.

The turning of dial knob 82 to the indicated 40 m.p.h. will open pressure regulating valve 80, and pressure in lines 71 and 74, and hence, in the right side of cylinder 60, will be reduced.

With pump 70 operating and pumping fluid through line 100, diaphragm pressure valve 120 is open, and servo pressure regulator valve 140 is controlling the pressure of fluid passing through it to solenoid valve 200. Solenoid valve 200 is now energized and open to permit fluid to pass from port A through port B, and then through line 210 to the left side of cylinder 60, thus causing piston 44 and actuator rod 40 to move to the right, against the reduced pressure in the right side of cylinder 60. The operation of link 52 and butterfly valve 54 in carburetor 55 will then be controlled by actuator rod 40, instead of by arm 30, and said butterfly valve 54 will open to increase throttle, while rod 30, rod 21, and pedal 10 will remain stationary, with detent 400 abutting on and depressing plunger 303 to hold micro switch 302 in closed position.

Under these conditions, pressure in line 142 will decrease, due to the opening of pressure regulating valve 80 and the consequent reduction of pressure in line 71. Servo pressure regulating valve 140 will then open to a greater degree, thus increasing the fluid pressure in line 210 and in the left side of cylinder 60, and causing piston 44 to move to the right, as hereinabove described.

Spring 145 in servo pressure regulator valve 140 is pre-set by manipulation of screw adjustment 146 to permit a predetermined pressure to build up in line 180 and its connecting lines, when the vehicle is moving at or beyond the speed of, say, 15 m.p.h., so that pressure in line 100 has caused diaphragm pressure valve 120 to open and permit passage of fluid under pressure through line 160 into line 170 and then into servo pressure regulator valve 140.

Bellows 163 in servo pressure regulator valve 140 is positioned to act against the biasing action of spring 145 on diaphragm 147 of servo pressure regulator valve 140, and said bellows 163 is activated by pressure in lines 71 and 142. It will thus be seen that any increase in pressure acting upon bellows 163 will cause a corresponding decrease in pressure in fluid running through lines 180 and 210, and a decrease in pressure in the left side of cylinder 60, allowing piston 44 to move to the left, and similarly, any decrease in pressure on bellows 163 will cause a corresponding increase in pressure in lines 180 and 210 and an increase in pressure in the left side of cylinder 60, allowing piston 44 to move to the right.

Assuming that the pressure in line 170 is between 40 and 60 p.s.i., and assuming that no substantial pressure is being exerted on bellows 163, under those assumed facts, servo pressure regulator valve 140 will be acting as any other pressure regulating valve. If the spring biasing pressure of spring 145 on diaphragm 147 is eliminated, servo pressure regulator valve 140 will completely shut off pressure flow in lines 170 and 180. As said spring pressure is increased, servo pressure regulator valve 140 will open. Consequently, servo pressure regulator valve 140 can maintain a pressure in line 180 and connecting lines in any degree from zero to whatever the incoming pressure in line 170 happens to be. Assume, for example, that there is no substantial pressure from line 142 against bellows 163. Normally, spring 145 will be regulated to allow, say, a pressure of approximately 30 p.s.i. to be maintained in line 180. As long as the incoming pressure in line 170 remains above 30 p.s.i., servo pressure regulator valve 140 will maintain a 30 p.s.i. discharge pressure into line 180.

As pressure builds up in line 142 and bellows 163, the biasing action of spring 145 will be restricted, and servo pressure regulator valve 140 will throttle down so that discharge pressure into line 180 will drop from 30 p.s.i. to, say, 20 p.s.i. As pressure against bellows 163 then increases, discharge pressure into line 180 will drop below 20 p.s.i. Similarly, as pressure against bellows 163 drops, discharge pressure from servo pressure regulator valve 140 to line 180 will again increase in line 180.

Under these conditions, with pressure increasing in line 180, and with fluid pressure established in solenoid valve 200 from port A to port B, pressure will similarly increase in line 210, moving piston 44 in cylinder 60 to the right, and in turn moving actuator arm 40 to the right, thereby increasing throttle by moving shank 50 to the right and causing link 52 to open butterfly valve 54 in carburetor 55.

This increased throttle will continue, directly proportionate to the speed of the vehicle, until the desired speed of 40 m.p.h., predetermined by control valve 80, has been reached, at which point pressure in lines 71 and 74 and in the right side of cylinder 60 will balance the pressure in lines 180 and 210 and in the left side of cylinder 60, and increased pressure in line 142 and on bellows 163 will cause servo pressure regulator valve 140 to throttle down and maintain said balance of pressure in cylinder 60.

Under these conditions, if the driver of a vehicle should desire to increase or decrease his controlled speed, he need only change his dial setting on dial 84 and dial knob 82.

With the dial setting at, say, 40 m.p.h., if the vehicle starts proceeding on an up-grade, it will commence to slow down, and when the speed varies from the dial setting, pressure output from pump 70 and in lines leading from it will drop, because the operation of pump 70 is directly related to the speed of the vehicle. Pressure in the right side of cylinder 60 will therefore decrease, and pressure on bellows 163 will similarly decrease, opening servo pressure regulator valve 140, thereby increasing the pressure through lines 180 and 210 and in the left side of cylinder 60, causing piston 44 to move further to the right, and, in sequence, moving link 52 to increase throttle in carburetor 55. These conditions will continue until the set vehicular speed of 40 m.p.h. is again reached, at which time the pressure in the left side of cylinder 60 and in the right side of cylinder 60 will again be in balance.

As the vehicle reaches the top of the grade and starts on a down-grade, the vehicular speed will increase, increasing the output of pump 70 and consequently increasing the pressure on the right side of cylinder 60, while pressure on bellows 163 will similarly increase, lessening the pressure output from servo pressure regulator valve 140, and ultimately decreasing the pressure in the left side of cylinder 60, so that piston 44 will move to the left, decreasing throttle in carburetor 55 until the vehicular speed has decreased to approximately the speed setting on dial 84, at which point pressure in the left side of cylinder 60 and in the right side of cylinder 60 will again be in balance to maintain the predetermined speed.

If the vehicle is proceeding at a controlled speed of 40 m.p.h., and the driver wishes to pass a slower moving vehicle, he need merely increase his pressure on foot pedal 10, causing detent 400 to pass its contact point with plunger 303. This will open the micro switch 302 and render solenoid valve 200 inoperative, so that fluid passage from port A to port B of solenoid valve 200 will be closed, but fluid passage from port B to port C will be open.

Pressure in line 210 and in the left side of cylinder 60 will then pass through port C and line 220 to the engine oil sump, but pump 70, in balance with the vehicular speed, will increase pressure in the rest of the system, causing pressure in the right side of cylinder 60 to increase, moving piston 44 to the left until shank 50 is no longer in operative contact with actuator arm 40, whereupon the operation of shank 50, link 52, and butterfly valve 54 will be controlled solely by abutment of shoulder 32 of rod 30 on shank 50, and increased throttle is thereby attained, with the speed control features of the device effectively inoperative.

When the driver has passed the slower moving vehicle and returned to his proper driving lane, if he now desires to return to the controlled 40 m.p.h. speed, he need merely decrease his pressure on pedal 10 until detent 400 is again in contact with plunger 303, whereupon micro switch 302 will be closed and solenoid valve 200 again becomes operative to permit the controlled speed functions of the device to operate in the manner hereinabove described.

If at that time the speed of the vehicle exceeds the control speed setting of 40 m.p.h., the vehicle will slow down to the control speed setting, and if it is under 40 m.p.h., the vehicle will increase speed to the control setting.

If an emergency should occur and the driver wishes to slow down sharply, he need only release pressure on pedal 10, and a similar sequence of the events described above will occur.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent structures and devices.

What is claimed is:

1. A device for adjustable control of the speed of operation of an internal combustion engine which comprises: a first fluid sump; a fixed-volume hydraulic pump controlled by the vehicular speed of an automotive vehicle and operatively connected to said first sump; a hydraulic cylinder having a first and a second end; a first hydraulic fluid line adapted to deliver fluid from said pump to the first end of said cylinder; a second hydraulic fluid line leading from said first fluid line to said first sump; means for introducing hydraulic pressure from said first fluid line to said second fluid line; means for controlling hydraulic pressure in said first fluid line by controlling hydraulic pressure in said second fluid line; a second fluid sump; a third hydraulic fluid line adapted to deliver fluid from said second sump means for introducing hydraulic pressure into said third fluid line; a first pressure regulating valve mounted on said third fluid line; a second pressure regulating valve mounted on said third fluid line downstream of said first pressure regulating valve so that the first pressure regulating valve will prevent passage of fluid under pressure from said third fluid line to said second pressure regulating valve until a predetermined pressure related to vehicular speed is attained in the first fluid line; a fourth hydraulic fluid pressure line leading from said second pressure regulating valve; a by-pass solenoid valve operatively connected to said fourth fluid line; a fifth hydraulic fluid pressure line leading from said solenoid valve to the second end of said cylinder; a hydraulic fluid exhaust line leading from said solenoid valve to said second sump; a reciprocating piston slidably disposed in said cylinder; a piston rod mounted on said piston and protruding from the first end of said cylinder; a carburetor; a flow valve mounted in said carburetor; and means connected to said piston rod and to said flow valve for operating said flow valve upon reciprocal movement of said piston rod and piston.

2. A device for adjustable control of the speed of operation of an internal combustion engine, as defined in claim 1, wherein the means for controlling hydraulic pressure in said second fluid line comprises: a third pressure regulating valve mounted on said second fluid line and disposed between said first hydraulic fluid line and said first fluid sump.

3. A device for adjustable control of the speed of operation of an internal combustion engine, as defined in claim 2, including means for manually, selectively setting said third pressure regulating valve.

4. A device for adjustable control of the speed of operation of an internal combustion engine, as defined in claim 1, including a fifth hydraulic fluid pressure line leading from said first fluid line to said first pressure regulating valve; and a sixth hydraulic fluid pressure line leading from said first fluid line to said second pressure regulating valve.

5. A device for adjustable control of the speed of operation of an internal combustion engine, as defined in claim 1, including a seventh hydraulic fluid pressure line leading from said fourth fluid line to said second sump.

6. A device for adjustable control of the speed of operation of an internal combustion engine, as defined in claim 5, including a fixed orifice mounted in said seventh fluid line intermediate the ends of said seventh fluid line so as to enable the second pressure regulator valve to maintain a constant pressure.

7. A device for adjustable control of the speed of operation of an internal combustion engine which comprises: a first fluid sump; a fixed-volume hydraulic pump controlled by the vehicular speed of an automotive vehicle and operatively connected to said first sump; a hydraulic cylinder having a first and a second end; a first hydraulic fluid line adapted to deliver fluid from said pump to said first end of said cylinder; a second hydraulic fluid line leading from said first fluid line to said first sump; means for introducing hydraulic pressure from said pump into said first fluid line and into said second fluid line; means for controlling hydraulic pressure in said first fluid line by controlling hydraulic pressure in said second fluid line; a second fluid sump; a third hydraulic fluid line adapted to deliver fluid from said second sump means for introducing hydraulic pressure into said third fluid line; a first pressure regulating valve mounted on said third fluid line so as to prevent passage of fluid under pressure from said third fluid line to said second pressure regulating valve until a predetermined pressure related to vehicular speed is attained in the first fluid line; a second pressure regulating valve mounted on said third fluid line downstream of said first pressure regulating valve; a fourth hydraulic fluid pressure line leading from said second pressure regulating valve; a by-pass solenoid valve operatively connected to said fourth line; electrical means for selectively activating and de-activating said solenoid valve; a fifth hydraulic fluid pressure line leading from said solenoid valve to the second end of said cylinder; a reciprocating piston slidably disposed in said cylinder; a piston rod mounted on said piston and protruding from the first end of said cylinder; a carburetor; a flow valve mounted in said carburetor; and means connected to said piston rod and to said flow valve for operating said flow valve upon reciprocal movement of said piston rod and piston.

8. A device for adjustable control of the speed of operation of an internal combustion engine which comprises: a carburetor; a flow valve mounted in said carburetor; a hydraulic cylinder having ends; a reciprocating piston slidably disposed in said cylinder between said ends; a piston rod mounted on said piston and protruding from one end of said cylinder; means connected to said piston rod and to said flow valve for operating said flow valve upon reciprocal movement of said piston rod and piston; a first source of fluid; a fixed volume hydraulic pump controlled by the vehicular speed of an automotive vehicle and operatively connected to said first source of fluid; a first hydraulic fluid pressure system interconnecting said pump and the said one end of said hydraulic cylinder and interconnecting said pump and said first source of fluid; means in said first hydraulic fluid pressure system between said pump and said first source of fluid for regulating pressure in said first system; a second hydraulic fluid pressure system leading from a second source of fluid, under pressure, to the other end of said cylinder; means for introducing hydraulic pressure from said pump into said first hydraulic fluid pressure system and into said second hydraulic fluid pressure system; a by-pass solenoid valve disposed in said second hydraulic fluid pressure system; pressure regulating means disposed in said second hydraulic fluid pressure system between said second source of fluid and said solenoid valve, said pressure regulating means being responsive to changes in hydraulic pressure in said first hydraulic fluid pressure system; a by-pass hydraulic fluid pressure line disposed between said pressure regulating means and said solenoid valve and leading from said second hydraulic fluid pressure system to said second source of fluid; and hydraulic fluid pressure means leading from said pump to said pressure regulating means disposed in said second hydraulic fluid pressure system.

9. A device for adjustable control of the speed of operation of an internal combustion engine, as defined in claim 8, wherein the means in said first hydraulic fluid pressure system between said pump and said first source of fluid, for regulating pressure therein comprises a selective, manually operable pressure regulating valve.

10. A device for adjustable control of the speed of operation of an internal combustion engine, as defined in claim 8, including a hydraulic fluid pressure line leading from said solenoid valve to said by-pass hydraulic fluid pressure line.

11. A device for adjustable control of the speed of operation of an internal combustion engine, as defined in claim 8, including a source of electrical power; a first electric current line leading from said source of electrical power; a master switch connected to said first electric current line; a second electric current line leading from said master switch to said solenoid valve so as to activate said solenoid valve when said master switch is closed; and a third electric current line leading from said solenoid valve to a ground.

12. A device for adjustable control of the speed of operation of an internal combustion engine which comprises: a carburetor; a flow valve mounted in said carburetor; a hydraulic cylinder having ends; a reciprocating piston slidably disposed in said cylinder between said ends; a piston rod mounted on said piston and protruding from one end of said cylinder; means connected to said piston rod and to said flow valve for operating said flow valve upon reciprocal movement of said piston rod and piston; a first source of fluid; a fixed volume hydraulic pump controlled by the vehicular speed of an automotive vehicle and operatively connected to said first source of fluid; a first hydraulic fluid pressure system interconnecting said pump and the said one end of said hydraulic cylinder and interconnecting said pump and said first source of fluid; means in said first hydraulic fluid pressure system between said pump and said first source of fluid for regulating pressure in said first system; a second hydraulic fluid pressure system leading from a second source of fluid, under pressure, to the other end of said cylinder; means for introducing hydraulic pressure from said pump into said first hydraulic fluid pressure system and into said second hydraulic fluid pressure system; a by-pass solenoid valve disposed in said second hydraulic fluid pressure system; pressure regulating means disposed in said second hydraulic fluid pressure system between said second source of fluid and said solenoid valve; a by-pass hydraulic fluid pressure line disposed between said pressure regulating means and said solenoid valve and leading from said second hydraulic fluid pressure system to said second source of fluid; and hydraulic fluid pressure means leading from said pump to said pressure regulating means disposed in said second hydraulic fluid pressure system; whereby increased vehicular speed will increase pressure in said first system, will decrease pressure in said second system, and will move said piston and piston rod so as to close said flow valve in said carburetor, and decreased vehicular speed will decrease pressure in said first system, will increase pressure in said second system, and will move said piston and piston rod reciprocally so as to open said flow valve.

13. A device for adjustable control of the speed of operation of an internal combustion engine which comprises: a carburetor; a flow valve mounted in said carburetor; a hydraulic cylinder having ends; a reciprocating piston slidably disposed in said cylinder between the ends; a piston rod mounted on said piston and protruding from one end of said cylinder; a link having ends, one end of said link being connected to said flow valve, and the other end of said link being pivotally connected to said piston rod, so as to operate said flow valve upon reciprocal movement of said piston rod and piston; a first source of fluid; a fixed volume hydraulic pump controlled by the vehicular speed of an automotive vehicle and operatively connected to said source of fluid; a first hydraulic fluid pressure system interconnecting said pump and the said end of said hydraulic cylinder and interconnecting said pump and said first source of fluid; means in said first hydraulic fluid pressure system between said pump and said first source of fluid for regulating pressure in said first system; a second hydraulic fluid pressure system leading from a second source of fluid, under pressure, to the other end of said cylinder; means for introducing hydraulic pressure from said pump into said first hydraulic fluid pressure system and into said second hydraulic fluid pressure system; a by-pass solenoid valve disposed in said second hydraulic fluid pressure system; pressure regulating means disposed in said second hydraulic fluid pressure system between said second source of fluid and said solenoid valve; a by-pass hydraulic fluid pressure line disposed between said pressure regulating means and said solenoid valve leading from said second hydraulic fluid pressure system to said second source of fluid; and hydraulic fluid pressure means leading from said pump to said pressure regulating means disposed in said second hydraulic fluid pressure system.

14. A device for adjustable control of the speed of operation of an internal combustion engine, as defined in claim 13, including means biasing said link and flow valve to a closed position of said flow valve.

15. A device for adjustable control of the speed of operation of an internal combustion engine which comprises: a carburetor; a flow valve mounted in said carburetor; a hydraulic cylinder having ends; a reciprocating piston slidably disposed in said cylinder between said ends; a piston rod mounted on said piston and protruding from one end of said cylinder; a link having ends, one end of said link being connected to said flow valve, and the other end of said link being selectively engagably and disengagably connected to said piston rod so as to operate said flow valve upon reciprocal movement of said piston rod and piston; means mounted on said link for selectively, mechanically operating said link and flow valve when said link is disengaged from said piston rod; a first source of fluid; a fixed volume hydraulic pump controlled by the vehicular speed of an automotive vehicle and operatively connected to said first source of fluid; a first hydraulic fluid pressure system interconnecting said pump and the said end of said hydraulic cylinder and interconnecting said pump and said first source of fluid; means in said first hydraulic fluid pressure system between said pump and said first source of fluid for regulating pressure in said first system; a second hydraulic fluid pressure system leading from a second source of fluid, under pressure, to the other end of said cylinder; means for introducing hydraulic pressure from said pump into said first hydraulic fluid pressure system and into said second hydraulic fluid pressure system; a by-pass solenoid valve disposed in said second hydraulic fluid pressure system; an electric circuit connected to said solenoid valve; an electric master switch disposed in said circuit so as to activate said solenoid valve when said master switch is closed; a micro switch disposed in said circuit so as to activate said solenoid valve when said micro switch is closed; means mounted on the means for mechanically operating said link and flow valve for selectively closing said micro switch when said link and flow valve are engaged with said piston rod, and opening said micro switch when said link and flow valve are disengaged from said piston rod; pressure regulating means disposed in said second hydraulic fluid pressure system between said second source of fluid and said solenoid valve; a by-pass hydraulic fluid pressure line disposed between said pressure regulating means and said solenoid valve and leading from said second hydraulic fluid pressure system to said second source of fluid; and hydraulic fluid pressure means leading from said pump to said pressure regulating means disposed in said second hydraulic fluid pressure system.

16. A device for adjustable control of the speed of operation of an internal combustion engine, as defined in claim 15, wherein the means for selectively, mechanically operating said link and flow valve comprises: an accelerator pedal; a mechanical linkage between said accelerator pedal and said link.

17. A device for adjustable control of the speed of operation of an internal combustion engine as defined in claim 16, wherein the means for selectively closing and opening said micro switch comprises: a plunger mounted on said micro switch and protruding therefrom; and a detent mounted on said mechanical linkage and disposed so as to selectively operate said plunger.

18. A device for adjustable control of the speed of operation of an internal combustion engine, as defined in claim 15, including means for selectively, manually setting said means for regulating pressure in said first system.

References Cited in the file of this patent
UNITED STATES PATENTS

| | | |
|---|---|---|
| 2,324,191 | Bowers | July 13, 1943 |
| 2,453,377 | Lozivit | Nov. 9, 1948 |
| 2,640,551 | Plumb | June 2, 1953 |
| 2,671,542 | Robnett | Mar. 9, 1954 |
| 2,714,880 | Riley | Aug. 9, 1955 |
| 2,737,165 | Thorner | Mar. 6, 1956 |
| 2,765,800 | Drake | Oct. 9, 1956 |
| 2,916,100 | Teetor | Dec. 8, 1959 |
| 2,925,066 | Thorner | Feb. 16, 1960 |
| 2,972,391 | Faiver et al. | Feb. 21, 1961 |
| 3,023,828 | Fuller et al. | Mar. 6, 1962 |
| 3,062,312 | Dietrich et al. | Nov. 6, 1962 |